United States Patent [19]

Mizukami

[11] 4,450,474
[45] May 22, 1984

[54] PAL SYSTEM SYNCHRONIZING SIGNAL GENERATING APPARATUS

[75] Inventor: Mineo Mizukami, Tokyo, Japan

[73] Assignee: Nippon Electric Co., Ltd., Tokyo, Japan

[21] Appl. No.: 365,683

[22] Filed: Apr. 5, 1982

[30] Foreign Application Priority Data

Apr. 3, 1981 [JP] Japan ................................ 56-50083

[51] Int. Cl.³ .......................... H04N 9/46; H04N 5/06
[52] U.S. Cl. ...................................... 358/19; 358/150
[58] Field of Search ....................... 358/17, 18, 19, 20, 358/150, 148, 153, 154

Primary Examiner—John C. Martin
Assistant Examiner—Luan Nguyen
Attorney, Agent, or Firm—Sughrue, Mion, Zinn, Macpeak & Seas

[57] ABSTRACT

Synchronizing signals in a PAL system are generated without the need for an n $f_H$ oscillator by generating a reference signal having 568 cycles per line, adding a half cycle per line and then substracting one cycle per field. Pre-synchronizing signals are generated from the processed reference signal and the pre-synchronizing signals are then phase shifted by an amount which varies linearly with respect to elapsed time during each field from a value of zero to a value of substantially 1/(2 $f_{sc}$).

8 Claims, 7 Drawing Figures

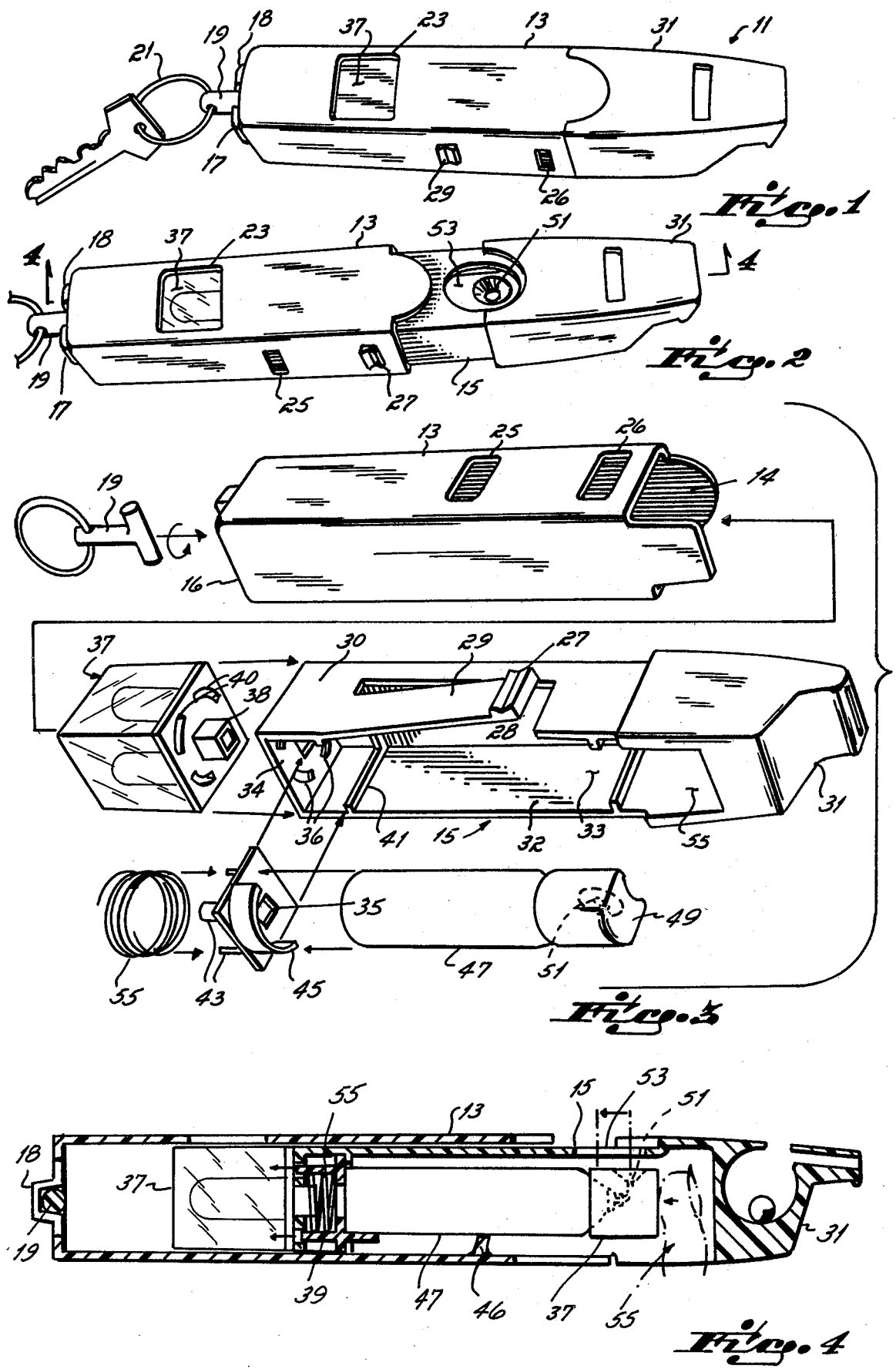

PAL SYSTEM SYNCHRONIZING SIGNAL GENERATING APPARATUS

BACKGROUND OF THE INVENTION

The present invention relates to a television synchronizing signal generating apparatus and, more particularly, to a PAL system synchronizing signal generating apparatus which outputs synchronizing signals such as a subcarrier, a horizontal driving synchronizing (H sync) signal, a vertical driving synchronizing (V sync) signal, a composite synchronizing signal, a composite blanking signal, a burst flag signal and a PAL identification signal.

In a PAL system, the relationship between the color subcarrier frequency $f_{sc}$ and the H sync signal frequency $f_H$ is given by $$f_{sc} = \left( \frac{1135}{4} + \frac{1}{625} \right) f_H \qquad (1)$$

Because of the offset term $(1/625)f_H$ in the equation (1), it is impossible to produce the H sync signal by simply multiplying and counting down the subcarrier frequency $f_{sc}$. Accordingly, the other synchronizing signals, that is, the V sync signal, the burst flag signal, the PAL identification signal and the blanking signal which rely upon the H sync signal, are difficult to produce.

An integrated circuit capable of producing the H sync signal, V sync signal etc. has been developed and offered on the market. This integrated circuit (IC) requires a clock signal having a frequency n-times as large as the H sync frequency. One example of such an integrated circuit is HD 44007 produced by Hitachi Ltd. in Japan which requires a frequency 282 times that of the H sync frequency as the clock signal. Therefore, a prior art PAL system synchronizing signal generator contains two oscillators, i.e., an oscillator for producing a subcarrier and an oscillator for producing the clock of a frequency n-times higher than the H sync signal frequency, and requires a very complicated circuit.

SUMMARY OF THE INVENTION

It is, therefore, an object of the present invention to provide a PAL system synchronizing signal generating apparatus which requires less circuit components.

Another object of the present invention is to provide a PAL system synchronizing signal generating apparatus which does not require an oscillator for producing a clock having a frequency n-times the H synchronizing frequency.

According to the present invention, there is provided a synchronizing signal generating apparatus comprising means for producing a reference signal having a double subcarrier frequency, means for inverting the polarity of the reference signal in response to a PAL identification signal in order to obtain a clock signal which contains 568 cycles of the reference signal in each horizontal line, gate means for eliminating one cycle from the cycles of the clock signal delivered from the inverting means in one field, means responsive to the clock signal delivered from the gate means for producing synchronizing signals including at least a horizontal synchronizing signal, a vertical synchronizing signal and the PAL identification signal, and means for shifting the phase of the synchronizing signals in each field by an amount varying linearly from zero at the start of the field to $1/2f_{sc}$ ($f_{sc}$: subcarrier frequency) at the end of the field.

BRIEF DESCRIPTION OF THE DRAWINGS

FIG. 1 shows a block diagram of a prior art synchronizing signal generator;

FIG. 2 shows a block diagram of a first embodiment according to the present invention;

FIGS. 3(a), 3(b) and 3(c) are waveforms for explaining an operation of an exclusive-OR gate shown in FIG. 2;

FIG. 4 shows a phase difference between a H sync signal produced in a synchronizing signal producing unit shown in FIG. 2 and the official normal H sync signal for every field; and FIG. 5 shows a block diagram of a second embodiment according to the present invention.

DESCRIPTION OF THE PRIOR ART

First, a prior art PAL system synchronizing signal generator will be described to help in understanding of the present invention. In FIG. 1, an oscillator 1 outputs a reference pulse signal having a frequency $4f_{sc}$ four times the subcarrier frequency and sends it to a frequency divider 2, an AND gate 3 and a two-clock counter 4. The frequency divider 2 divides the reference pulse signal by four to produce a color subcarrier $f_{sc}$. The two-clock counter 4 provides an inhibitive pulse 15 to the AND gate 3 during two reference pulses every field to adjust the pulse number of the reference pulses to be passed through the gate 3 for one field in order to satisfy the equation (1). The reference pulse signal delivered from the AND gate 3 is supplied to a frequency divider 5, which divides the reference pulse signal from the AND gate 3 by 1135, to produce a H sync rate signal 16 which is transmitted to a phase comparator 6. The phase comparator 6 compares the phase relationship between the H sync rate signal 16 delivered from the frequency divider 5 and a H sync signal 11 delivered through a phase modulator 13, and feeds the phase difference signal to a clock oscillator 7. The clock oscillator 7 outputs a clock having a frequency n-times the H sync frequency to a synchronizing signal producing unit 7. The integer n depends on the requirement of the synchronizing signal producing unit 8 and is usually 150 to 600. The synchronizing signal producing unit 8 produces a horizontal synchronizing (H sync) signal by counting the clock and also produces many other synchronizing signals 10 such as a composite synchronizing signal, a composite blanking signal, a burst flag signal, a PAL identification signal and a vertical synchronizing driving (V sync) signal with predetermined pulse widths in dependence on the H sync signal and the clock. A latch circuit 9 latches all synchronizing signals 10 produced in the unit 8 in accordance with the clock in order to adjust timing of all synchronizing signals 10. Among the signals 10, the H sync signal 11 and the V sync signals 12 are picked up and supplied to the phase modulator 13 and the two-clock counter 4, respectively. The V sync signal 12 is supplied to the two-clock counter 4 as a timing signal.

The frequency of H sync rate signal 16

$$\left( \frac{4}{1135} f_{sc} \right)$$

delivered from the frequency divider 5 is a little bit higher than that of the H sync signal 11, and the phase difference between the H sync rate signal 16 and the H sync signal 11 is cancelled at every V sync timing by the AND gate 3. Consequently, the phase difference between the H sync rate signal 16 and the H sync signal 11 linearly varies from zero to (1/2$f_{sc}$) during every field. The phase modulator 13 compensates such phase difference by delaying or shifting the phase of the H sync signal 11. To this end, a sawtooth wave generator 14 produces a sawtooth wave signal having frequency equal to the V sync frequency in accordance with the inhibitive signal delivered from the two-clock counter 4. The sawtooth wave signal from the generator 14 is supplied to the phase modulator 13 in order to control the phase shift amount of the H sync signal 11. As described above, the synchronizing signal producing unit 8 produces synchronizing signals 10 which follow the PAL system equation (1).

Other modified configurations similar to the prior art technique shown in FIG. 1 may be considered. However, in any case, the n-times H sync frequency oscillator should be employed in addition to the oscillator for producing the color subcarrier $f_{sc}$.

DETAILED DESCRIPTION OF THE PREFERRED EMBODIMENTS

First, the principle of the present invention will be described. If, the PAL system equation (1) is modified to be, $$f_{sc} = \frac{1135}{4} f_{H'} \qquad (2)$$

and $$4f_{sc} = 1135 f_{H'} \qquad (3)$$

the equation (3) indicates that the signal having frequency $f_{H'}$ can be easily and simply co-related to the color subcarrier by frequency-dividing the frequency of $4f_{sc}$ which is four-times the subcarrier frequency by 1135. According to the present invention, such a signal having a frequency $f_{H'}$ (or n-times $f_{H'}$) is applied to a synchronizing signal producing unit as a clock signal, and a phase compensation to satisfy the PAL system equation (1) is performed at the output side of the synchronizing signal producing unit. According to the present invention, an oscillator having a frequency n-times the H sync frequency, e.g., the oscillator 7 (FIG. 1), which requires much hardware and a complicated circuit can be removed.

In FIG. 2 showing the first embodiment of the present invention, a synchronizing signal producing unit 8 requiring a frequency of 568-times the H sync frequency as a clock signal is used. The synchronizing signal producing unit 8 produces synchronizing signals 10 including a composite synchronizing signal, a composite blanking signal, a H sync signal, a V sync signal, a burst flag signal and a PAL identification signal. However, the synchronizing signals 10 contain a phase error and are, hereinafter, defined as pre-synchronizing signals 10 such as a pre-composite synchronizing signal, a pre-composite blanking signal, a pre-H sync signal, a pre-V sync signal, a pre-burst flag signal and a pre-PAL identification signal. An oscillator 1 outputs a reference pulse signal having a frequency $4f_{sc}$ of four times the subcarrier frequency which is transmitted to a frequency divider 201 having frequency dividing rate of two. The double subcarrier frequency signal ($2f_{sc}$) delivered from the frequency divider 201 is supplied to a frequency divider 202 similar to the frequency divider 201 and an exclusive-OR gate 203. The frequency divider 202 outputs a color subcarrier. The pre-PAL identification signal 205 which is produced in the synchronizing signal producing unit 8 and delivered through a latch circuit 9 is also supplied to the exclusive-OR gate 203. The output of the exclusive-OR gate is supplied through an AND gate 210 to the synchronizing signal producing unit 8 as the clock signal. The exclusive-OR gate 203 increases the pulse edges in the signal (2 $f_{sc}$) delivered from the frequency counter 201 by one every field. In other words, the exclusive-OR gate 203 increases the cycles of the signal ($2f_{sc}$) by a half cycle in each field. FIGS. 3(a), 3(b) and 3(c) show the operation of the exclusive-OR gate 203. FIG. 3(a) indicates the signal ($2f_{sc}$) delivered from the frequency divider 201, FIG. 3(b) indicates the pre-PAL identification signal 205 and FIG. 3(c) indicates the output of the exclusive-OR gate 203. In the exclusive-OR gate 203, the pre-PAL identification signal 205 inverts the polarity of the signal ($2f_{sc}$). Consequently, one pulse edge (half cycle) is added to the output of the exclusive-OR gate 203 as shown in FIG. 3(c). Then, the AND gate 210 removes one pulse (one cycle) in the signal ($2f_{sc}$) every field and the operation of the AND gate 210 is similar to that of the AND gate 3 shown in FIG. 1, where the AND gate 3 removes two pulses in the signal ($4f_{sc}$) every field. A one-clock counter produces an inhibitive pulse to be supplied to the AND gate 210 at the timing of a pre-V sync signal 12 delivered from the latch circuit 9.

In the synchronizing signal producing unit 8, each line corresponds to 568 pulses (568 cycles) in the signal ($2f_{sc}$) delivered through the AND gate 210. However, because of the effect of the exclusive-OR gate 203, the period of the pre-H sync signal produced in the synchronizing signal producing unit 8 is expressed by $$567.5 \cdot \frac{1}{2f_{sc}} \text{ or } \frac{1135}{4} \cdot \frac{1}{f_{sc}} \qquad (4)$$

which is slightly shorter than the predetermined reference or normal H period following the equation (1). Therefore, the phase difference between the pre-H sync signal delivered from the synchronizing signal producing unit 8 and the predetermined reference or ruled H sync signal following the equation (1) varies from zero to 1/2$f_{sc}$ every field as a sawtooth wave which is shown in FIG. 4. Such phase difference is defined as a phase error, hereinafter. Of course, the zero phase difference at the beginning of every field is effected by the AND gate 210. The opration of the AND gate 210 is such that only one line (horizontal period) is assigned 569 pulses (cycles) in the clock signal delivered from the exclusive-OR gate 203. Other remaining signals such as the pre-V sinc signal, the pre-composite synchronizing signal, and so on, in the pre-synchronizing signals 10 also contain the phase error.

Latch circuits 206 and 207 compensate the phase error in the pre-synchronizing signals 10. The clock signal ($2f_{sc}$) delivered from the exclusive-OR 203 is also transmitted to a phase modulator 208 and serially to a phase modulator 209 as a clock. A sawtooth wave generator 14 which is similar to the sawtooth wave generator 14 in FIG. 1 produces a sawtooth wave signal at the timing of the inhibitive pulse derived from the one-clock counter 204. The sawtooth wave signal from the generator 14 is applied to the phase modulators 208 and 209. The clock signals (2 $f_{sc}$) delivered from the phase modulators 208 and 209 are supplied to the latch circuits 206 and 207, respectively. Each combination of a phase modulator and latch circuit linearly varies the phase of the synchronizing signals 10 delivered through the latch circuit 9 from zero to $$\left(\frac{1}{2} \times \frac{1}{2f_{sc}}\right)$$

for each field. In the other words, two combinations of phase modulator and latch circuit delay the synchronizing signals 10 from zero to $1/2f_{sc}$ for every field in order to compensate the phase error. In this embodiment, two latch circuits and phase modulators are provided to obtain the maximum delay amount of $1/2f_{sc}$ such that linear and precise phase modulation is performed by limitting the shift amount with respect to one clock. In each phase modulator, the shift amount is less than one-half period of one clock. In the field of phase modulation techniques, it is well known that the phase shift amount should be limited to less than one-half a period of the clock in order to perform linear and precise phase modulation.

FIG. 5 shows a second embodiment according to the present invention in which a synchronizing signal producing unit 308 containing the HD 44007 integrated circuit, which requires a frequency 282-times of the H sync frequency as a clock, is used. The second embodiment is the same as the first embodiment shown in FIG. 2 up to the AND gate 210, the one-clock counter 204 and the sawtooth wave generator 14. In this embodiment, a frequency divider 301 produces two outputs, i.e., a two-frequency divided signal 302 ($f_{sc}$) and a 568-frequency divided signal 303 ($f_H'$). The two-frequency divided signal having a frequency $f_{sc}$ delivered from the frequency divider 301 is supplied through an AND gate 307 to the synchronizing signal producing unit 308 as the clock signal. The synchronizing signal producing unit 308 containing the HD 44007 produces pre-synchronizing signals 10 such as a pre-H sync signal, a pre-V sync signal, a pre-composite synchronizing signal, a pre-composite blanking signal, a pre-burst flag signal and a pre-PAL identification signal. The pre-synchronizing signals 10 also have the phase error similar those described in connection with the first embodiment of the invention. The phase error is compensated by a combination of a phase modulator 310 and a latch circuit 311 in this embodiment. The phase modulator 310 receives the two-frequency divided signal 302 ($f_{sc}$) as a clock. Therefore, one combination of the phase modulator modulator 310 and the latch circuit 311 can precisely vary the phase of the synchronizing signals 10 from zero to $1/2f_{sc}$ that is one-half the period of the clock ($f_{sc}$).

In this embodiment, the number 568 assigned in each line is not just a multiple of the number 282, which is the ratio to the H sync frequency $f_H$ required in the synchroning signal producing unit 308 as a clock, without a surplus. The surplus 2 {568−(2×282)} is compensated as follows. A S-R flip-flop 305 is set by the 568-frequency divided signal 303 and reset by the pre-H sync signal 304 which is produced in the synchronizing signal producing unit 308 and delivered from a latch circuit 309. The latch circuit 309 is similar to the latch circuit 9 in FIG. 1 or FIG. 2. The AND gate 307 passes the two-frequency divided signal ($f_{sc}$) 302 in response to the output 306 from the flip-flop 305 while the flip-flop 305 is set, and it inhibits the two-frequency divided signal 302 while the flip-flop is reset. The number of the inhibited pulses per line at the AND gate 307 is two in this embodiment, because the synchronizing signal producing unit 308 is renewed by 282 clock pulses (282 cycles) and the frequency divider 301 is renewed by 284 clock pulses (284 cycles). The real time corresponding to the two inhibited pulses is $$1.75 \frac{1}{f_{sc}},$$

since the exclusive-OR gate adds one pulse edge (a half cycle) every line. During this inhibitive period, the synchronizing signal producing unit 308 holds the value just before the AND gate 307 is closed.

Compared with the case where a frequency of 282-times the H sync frequency as the clock is employed, therefore, a portion corresponding to the inhibited clock pulses is elongated slightly and the remaining portion is compressed more slightly in the synchronizing signals 10. However, such elongation and compression in the synchronizing signals 10 are negligible in practice. If required, the elongation and compression in the synchronizing signals can be easily eliminated by using a shift register and a logic circuit. By applying the method of the second embodiment, any of a number of available synchronizing signal producing units requiring any frequency which is n-times the H sync frequency can be used.

As mentioned with reference to FIGS. 2 and 3, an important feature of the present invention resides in that synchronizing signals are generated without any need of an oscillator which oscillates at an integer multiple of the H sync frequency. Accordingly, synchronizing signals can be generated with stability and reliability without using a phase locked loop. When the synchronizing signal generating apparatus according to the present invention is to be locked to reference signal that are supplied from an external unit, the reference pulse signal produced in the oscillator 1 should be locked to the color subcarrier of the input signals fed from the external unit, and the synchronizing signal producing unit 8 in FIG. 2 should be reset by a frame pulse or PAL identification signal in the reference input signals fed from the external unit. In the case of FIG. 3, also, the synchronizing signal producing unit 308 should be reset by the frame pulse and the PAL identification signal in the reference input signals from the external unit, and the counter 301 should be reset by the frame pulse. Moreover, the functions of the exclusive-OR gate 203 and the AND gate 210 may be realized by presetting the counter, by the data load, by data addition, or the like. It should therefore be noted that the present invention is by no means limited to only the above-mentioned embodiment.

What is claimed is:

1. In a PAL system of the type having 625 lines per frame and two fields per frame of a television signal having a color subcarrier frequency $f_{sc}$, a PAL system synchronizing signal generating apparatus comprising:

means for producing a reference signal having a frequency ($2f_{sc}$) which is twice that of said color subcarrier frequency ($f_{sc}$);

generating means for generating 569 cycles of said reference signal during one line in each field and 568 cycles of said reference signal during all other lines;

means responsive to the output of said generating means for producing a pre-synchronizing signal; and means for shifting the phase of said pre-synchronizing signal to produce a synchronizing signal, the amount of phase shift varying linearly with respect to elapsed time during each field from zero at the start of each field to $1/2f_{sc}$ at the end of each field.

2. In a PAL system of the type having 625 lines per frame and two fields per frame of a television signal having a color subcarrier frequency $f_{sc}$, a PAL system synchronizing signal generating apparatus comprising:

means for producing a reference signal having a frequency which is twice that said of color subcarrier frequency;

means for increasing the number of cycles of said reference signal in each line by a half cycle;

means for eliminating one cycle from the number of cycles of the reference signal delivered from said increasing means in each field;

means for producing a pre-horizontal synchronizing signal by counting a predetermined number of cycles contained in the reference signal delivered from said eliminating means; and means for shifting the phase of said pre-horizontal synchronizing signal to produce a horizontal synchronizing signal, the amount of phase shift varying linearly with respect to elapsed time in each field from zero at the start of each field to 1/2fsc ($f_{sc}$: subcarrier frequency) at the end of each field period.

3. The PAL system synchronizing signal generating apparatus as claimed in claim 2, said shifting means comprising:

means for producing a sawtooth wave signal having a vertical synchronizing frequency;

a phase modulator for delaying said reference signal delivered from said increasing means in accordance with the amplitude of said sawtooth wave signal; and means for latching said pre-horizontal synchronizing signal delivered from said pre-horizontal synchronizing signal producing means by said reference signal delivered from said phase modulator.

4. The PAL system synchronizing signal generating apparatus as claimed in claim 2 or 3, further comprising means for producing a pre-PAL identification signal from said pre-horizontal synchronizing signal; and said increasing means including an exclusive-OR gate receiving and combining said reference signal delivered from said reference signal producing means and said pre-PAL identification signal.

5. In a PAL system of the type having 625 lines per frame and two fields per frame of a television signal having a color subcarrier frequency $f_{sc}$, a PAL system synchronizing signal generating apparatus comprising:

means for producing a reference signal having a frequency which is twice that of said color subcarrier:

means for increasing the number of cycles of said reference signal occurring during each line by a half cycle to provide 568 cycles of said reference signal per line;

means for eliminating one cycle from the number of cycles of the reference signal delivered from said increasing means in each field;

means for producing a pre-horizontal synchronizing signal by counting a predetermined number m (m<568) of cycles contained in the reference signal delivered from said eliminating means;

gate means provided in front of said pre-horizontal synchronizing signal producing means for passing said reference signal delivered from said eliminating means while the counted number of cycles of said reference signal supplied to said pre-horizontal synchronizing signal producing means is less than m; and means for shifting the phase of said pre-horizontal synchronizing signal to produce a horizontal synchronizing signal, the phase shift amount being linearly changed from zero to $1/2f_{sc}$ ($f_{sc}$: subcarrier frequency) during each field.

6. The PAL system synchronizing system generating apparatus as claimed in claim 1, wherein said generating means comprises:

first means for generating 568 cycles of said reference signal for each line; and second means for adding an additional cycle to said 568 generated cycles during one lline of each field.

7. The PAL system synchronizing signal generating apparatus as claimed in claim 6, further comprising means for producing a pre-synchronizing signal having one level transition during each field, said second means comprising an Exclusive-OR gate receiving and combining said 568-cycle reference signal and said pre-synchronizing signal.

8. The PAL system synchronizing signal generating apparatus as claimed in claim 5, wherein said gate means comprises:

dividing means for receiving said 568-cycle reference signal and providing a first frequency-divided output and a divide-by-568 cycle output;

a set-reset flip-flop receiving as its set input the divide-by-568 cycle output from said dividing means, said flip-flop receiving as its reset input a gate signal synchronized to a count of m; and an AND gate receiving and combining the first frequency-divided output from said dividing means and an output from said flip-flop.

* * * * *

UNITED STATES PATENT AND TRADEMARK OFFICE
CERTIFICATE OF CORRECTION

PATENT NO. : 4,450,474

DATED : May 22, 1984

INVENTOR(S) : Mineo MIZUKAMI, Tokyo, Japan

It is certified that error appears in the above-identified patent and that said Letters Patent is hereby corrected as shown below:

Column 1, line 53, delete "frequency".

Column 5, line 21, "limitting" should be --limiting--;

line 49, after "similar" insert --to--;

line 56, delete "modulator".

Column 8, line 38, "lline" should be --line--.

Signed and Sealed this

Ninth Day of April 1985

[SEAL]

*Attest:*

DONALD J. QUIGG

*Attesting Officer*     *Acting Commissioner of Patents and Trademarks*